United States Patent
Ferraro

[15] 3,678,903
[45] July 25, 1972

[54] ANIMAL RUN LEASH GUIDE ASSEMBLY

[72] Inventor: Natty P. Ferraro, 236 Valley Road, Cary, Ill. 60013

[22] Filed: Oct. 2, 1970

[21] Appl. No.: 77,686

[52] U.S. Cl. ........................................................... 119/120
[51] Int. Cl. .......................................................... A01k 03/00
[58] Field of Search .............................. 119/120, 29; 272/24

[56] References Cited

UNITED STATES PATENTS 1,563,212  11/1925  Madiar .................................. 119/120

*Primary Examiner*—Hugh R. Chamblee
*Attorney*—Silverman & Cass

[57] ABSTRACT

A leash guide assembly for confining the movement of a tethered animal to a limited area, but enabling controlled movement within the area along the guide assembly in opposite directions. A plurality of stationary retaining blocks provide a mount for an endless cable which defines the boundaries of the limited area. A traveler member having a hole therethrough is slidably secured along the cable and has a flange to which the tethered animal is secured. Each of the retaining blocks includes a pair of opposing resilient jaws defining a passageway within which the cable is retained, the resilient jaws being capable of spreading to permit the flange of the traveler to pass quickly and smoothly therebetween. A pair of inwardly turned lips on the jaws retains the cable in the passageway as the traveler passes therethrough.

7 Claims, 10 Drawing Figures

Patented July 25, 1972
3,678,903
2 Sheets-Sheet 1
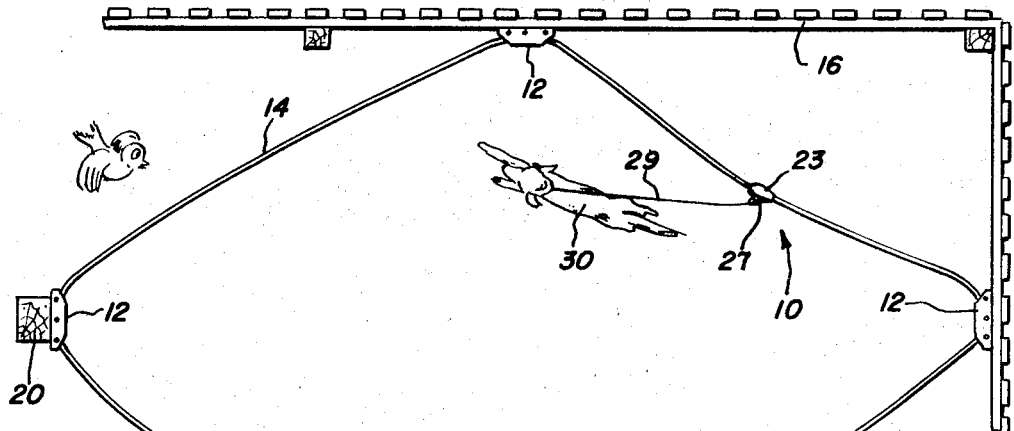
Fig.1
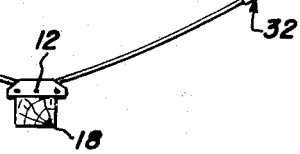
Fig.5
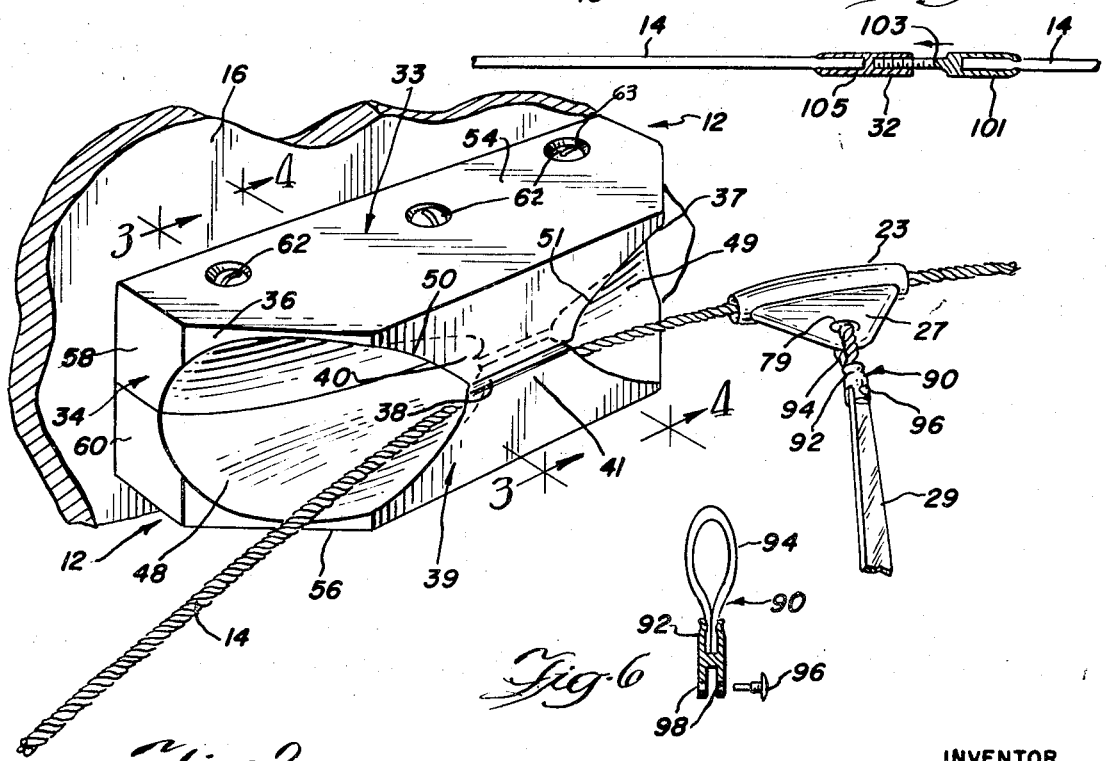
Fig.2
Fig.6
INVENTOR
Natty P. Ferraro
BY Silverman & Cass
ATTORNEYS Patented July 25, 1972
3,678,903
2 Sheets-Sheet 2
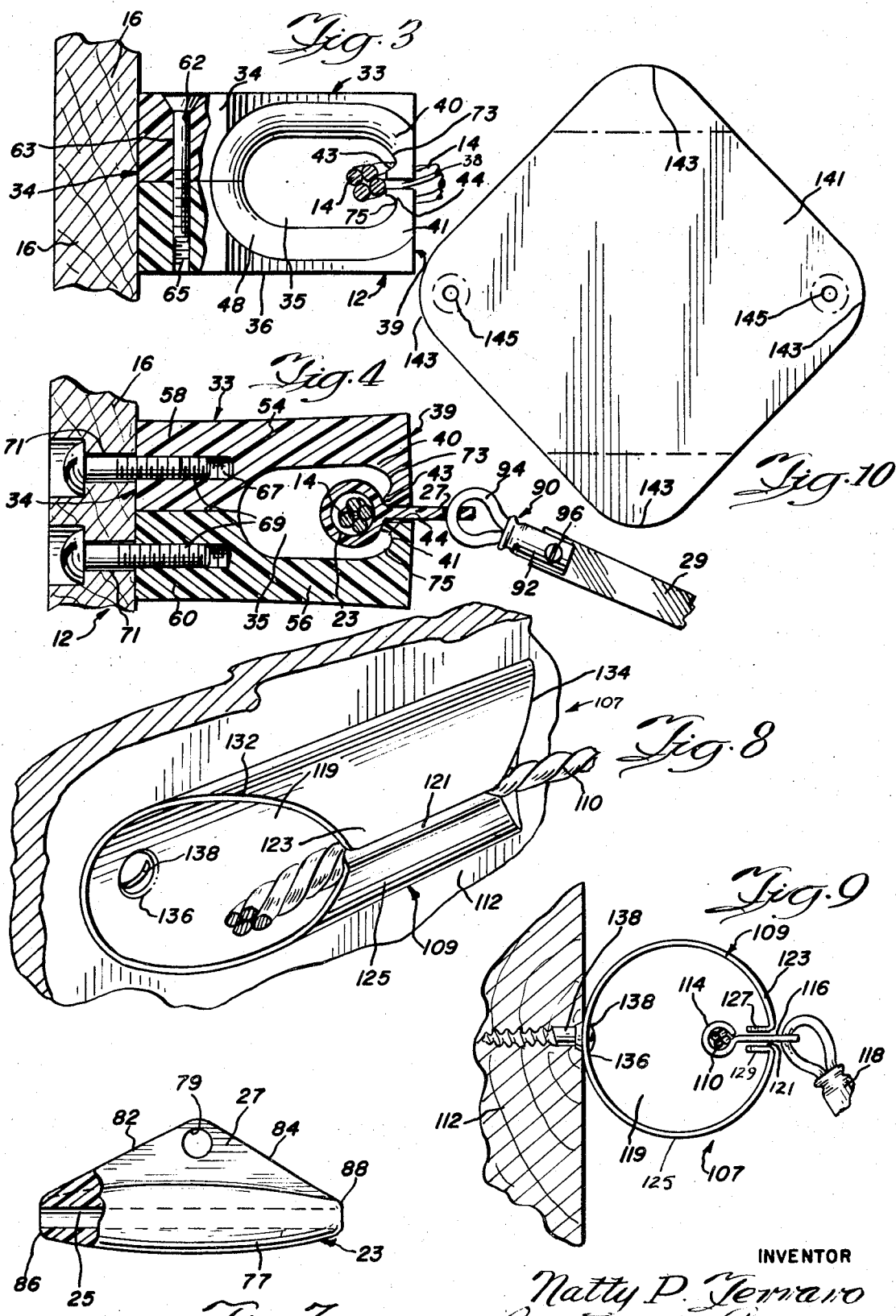
INVENTOR
Natty P. Ferraro
BY Silverman & Cass
ATTORNEYS 3,678,903

ANIMAL RUN LEASH GUIDE ASSEMBLY

BACKGROUND OF THE INVENTION

The present invention relates to an animal run leash guide assembly, and more particularly, relates to an assembly for mounting a tether line to a traveler movable along a cable supported by the assembly for restraining the movement of a tethered animal to a limited area, but permitting movement of the animal within the limited area in opposite directions along the cable.

Tethers mounted to movable elements have been employed to restrain the movement of animals, such as dogs, for exercising or patrolling purposes within a limited area. In order to permit the movable element to follow a broken-line path or a closed loop, a restraining cable was mounted to a plurality of posts by means of a slotted eye member through which a traveler was movable. The traveler was connected to a tether restraining the animal, and a slot in the eye member permitted the traveler to pass therethrough. For a more detailed description of this arrangement, reference may be made to U. S. Pat. No. 1,563,212. However, such an arrangement was not entirely satisfactory, since the traveler could not quickly and smoothly pass through the eye member without unduly impeding the movement of the animal and without jarring or jerking the running animal. Further, the traveler was not permissive of quick and easy passage through the eye member at any angle of engagement therewith. Also, the eye members could not be mounted in any orientation on any convenient supporting surface, including the ground, thus limiting adaptability of such tethers to pole mounting only.

SUMMARY OF THE INVENTION

An animal run leash guide assembly comprising at least one retaining device for mounting a cable to a support structure, and a traveler having a hole extending therethrough for sliding engagement along the cable, the traveler including a flange which is adapted to be secured to an animal tether. The retaining device includes a body portion having a passageway extending therethrough for loosely receiving the cable, and having pairs of opposing resilient jaws for retaining the cable in the passageway and for permitting the flange on the traveler to pass quickly and smoothly by spreading of the jaws therebetween without unduly impeding the movement of the animal. A pair of inwardly turned lips on the jaws prevents the cable from coming free of the retaining device as the traveler moves through the device. A pair of cam surfaces on opposite sides of the body portions of the device guides the flange of the traveler to a position between the jaws from either direction of movement of the traveler and from any angle of engagement of the flange of the traveler with the device so that the retaining device may be mounted in any orientation and on any convenient supporting surface, such as the ground or an upright structure.

Accordingly, the primary objects of the invention are as follows:

1. An animal run leash guide assembly which secures an animal tether mounted to a movable element and which permits the movable element to follow a broken-line or closed-loop path without unduly impeding the movement of the animal and without jarring or jerking the animal as it runs along the path.
2. An animal run leash guide assembly which can be mounted in any orientation on any convenient supporting surface including the ground.
3. An animal run leash guide assembly which includes one or more retaining devices for mounting an endless cable to a support structure and for enabling a traveler secured to an animal leash to pass quickly and smoothly through the retaining device as the animal runs past the devices.

Other objects of economy of manufacture and ease and simplicity of installation and operation will be apparent to the skilled artisan from the ensuing disclosure.

BRIEF DESCRIPTION OF THE DRAWINGS

FIG. 1 is a top plan view of an animal run leash guide assembly constructed in accordance with the invention showing an animal tethered thereto.

FIG. 2 is an enlarged perspective view of the traveler and one of the retaining devices positioned along a section of the cable of the invention.

FIG. 3 is a sectional view taken through the retaining device along the line 3—3 of FIG. 2, in the direction indicated generally.

FIG. 4 is a sectional view taken through the retaining device along the line 4—4 of FIG. 2, in the direction indicated generally, illustrating the traveler passing between the jaws thereof.

FIG. 5 is an enlarged fragmentary sectional view of a connector which connects the ends of the cable to form a closed loop.

FIG. 6 is an enlarged sectional view of a connector which connects the animal leash to the traveler.

FIG. 7 is a front plan view of the traveler of the invention with a portion thereof broken away.

FIG. 8 is a perspective view of an alternate form of the retaining device constructed in accordance with the invention.

FIG. 9 is a sectional end view of the retaining device of FIG. 8, illustrating the traveler passing therethrough.

FIG. 10 is a plan view of the template from which the retaining device of FIG. 8 is formed.

DESCRIPTION OF THE PREFERRED EMBODIMENTS

Referring to FIGS. 1 to 7 of the drawings, there is shown an animal run leash guide assembly embodying the invention indicated generally by reference character 10. The guide assembly 10 includes a plurality of retaining devices or blocks 12 which retain an endless cable 14 at spaced intervals therealong, to support structures such as the fence 16 and the posts 18 and 20. A traveler 23 having a hole 25 therethrough is loosely positioned along the cable 14 for slidable movement thereon. The traveler 23 has a fin or flange 27 which is secured to a leash or tether line 29, which in turn is secured to an animal 30. A connector 32 joins the ends of the cable to form an endless loop, but it is to be understood that the cable 14 may assume various different configurations, such as a broken-line configuration. Also, it is to be understood that the retaining devices 12 may be mounted on supporting surfaces other than those illustrated, such as directly on the ground. In use, the animal 30 can run in any direction within the limited area defined by the cable 14 and the leash 29. In this regard, as the animal 30 runs, the traveler 23 slides along the cable 14 and smoothly and quickly passes through the retaining devices 12 as described below. It is to be further understood that the size and strength of the retaining devices and the cable may be varied in accordance with the size and strength of the animal.

Considering now the retaining device 12 in greater detail with reference to FIGS. 2, 3, and 4 of the drawings, the device 12 generally includes a two-piece elongated block 33 having a base 34 adapted to be mounted on the support structure or ground and having a longitudinally extending passageway or hole 35 extending through a pair of oppositely-disposed sloping end faces 36 and 37 which loosely receive the cable 14. A longitudinally extending slit or opening 38 in a face 39 opposite the base 34 opens into the passageway 35 and divides the face 39 into a pair oppositely-disposed resilient jaws 40 and 41. The jaws 40 and 41 retain the cable 14 in the passageway 35 and are adapted to be spread apart by the flange 27 of the traveler 23 to permit the flange to pass therebetween without impeding the movement of the animal 30 as it runs past the retainer device 12. A pair of inwardly turned lips or flanges 43 and 44 adjacent the slit 38 on the respective jaws 40 and 41 prevent the cable 14 from coming free of the retaining device 12 as the traveler 23 moves through the device 12 within the passageway 35. A pair of smooth, inwardly tapered cam surfaces 48 and 49 on the opposite end faces 36 and 37, and partially on the base 34 at the opening of the passageway 35, guide the flange into a pair of oppositely-disposed generally V-shaped cutout portions 50 and 51 of the face 39, and thence into the slit 38 between the jaws 40 and 41 from either direction of movement of the traveler and from any angle of engagement of the flange with the block 33, so that the retaining device 12 may be mounted in any orientation and on any convenient support, such as the ground or an upright support.

The block 33 generally comprises a pair of complementary shaped members 54 and 56 which are composed of a resilient material, such as plastic, and which have base portions 58 and 60 joined together by a plurality of bolts 62 extending through vertically-extending countersunk holes 63 in the upper member 54 and into aligned vertically-extending threaded holes 65 in the lower member 56. As shown in FIG. 4, a plurality of horizontally-extending threaded holes 67 in the base portions 58 and 60 are off-set from the holes 63 and 65 and threadably receive a plurality of bolts 69, which extend through aligned countersunk holes 71 in the support structure 16. While the block 33 is shown and described as being a two-piece device, it is to be understood that a one-piece block may also be employed. With the jaws 40 and 41 in an unstressed condition as shown in FIG. 3, the width of the slit 38 is slightly less than the thickness of the flange 25 of the traveler 23, so as to retain the cable 14 in the hole 35. The jaws 40 and 41 are spread apart by the flange 25 as the traveler 23 passes through the device 12, as shown in FIG. 4, and the jaws resiliently snap back to their unstressed position after the traveler 23 passes through the device 12. As shown in FIG. 3, a pair of arcuate, enlarged portions 73 and 75 of the hole 35 are formed in the respective jaws 38 and 40 adjacent the lips 43 and 44 to receive the cable 14 when the traveler 23 is not disposed within the opening of the device 12.

As shown in FIG. 7, the traveler 23 includes a tubular body portion 77 which may be constructed of plastic material, and which has the flange 27 integrally connected to and extending from one side thereof. The flange 27 is generally triangular in shape and has an aperture or hole 79 so that the leash 29 can be secured to the traveler 23. The sloping edges 82 and 84 of the flange 27 are beveled to facilitate the entrance thereof into the slit 38. Moreover, the opposite end positions 86 and 88 of the tubular body portion 77 are smoothly rounded to facilitate the movement of the follower 23 through the device 12 when the follower 23 engages the cam surfaces 48 and 49 as the traveler moves through the device 12. In this regard, when the traveler 23 passes through the device 12, the leading end portion of the tubular member 77 and the leading edge of the flange 27 engage one of the cam surfaces and follow it into the V-shaped cutout portion of the face 39, and in so doing, the traveler 23 rotates about its axis within the passageway 35 until the flange 27 is aligned with the slit 38 to permit the flange 27 of the traveler 23 to spread apart the jaws 40 and 41 and thus to smoothly and easily pass therebetween.

Referring now to FIGS. 2, 4, and 6, in order to connect the leash 29 to the flange 27 of the traveler 23, there is provided a connector 90 comprising a generally tubular member 92 having a loop of cord 94 threaded through the hole 79 in the flange 27, which cord has its ends extending into one end of the tubular member 92 and fastened therein by any suitable means, such as crimping. The opposite end of the connector 92 is bifurcated and receives the end portion of the leash 29 which is fastened to the connector 92 by means of a screw 96 threaded through a pair of aligned holes 98 in the bifurcated end portion of the connector 92 and a hole (not shown) in the end portion of the leash 29.

Referring now to FIG. 5, the connector 32 for connecting the ends of the cable 14 generally comprises a hollow cylindrical male member 101 which receives one of the ends of the cable 14 and is fixed thereto by crimping it in place, and which has a threaded shank portion 103 threaded into a female connector member 105. The female connector member 105 receives the opposite end of the cable 14 and is fixed thereto by crimping it in place. In accordance with the present invention, any number of connector members 32 may be employed with a plurality of cables so that they can be interconnected end to end, and thus extend through any path, including a broken-line path or a large loop.

Referring now to FIGS. 8, 9, and 10 of the drawings, there is shown an alternate form of animal run leash guide assembly 107. The assembly 107 includes at least one retaining device 109 for receiving and mounting a cable 110 to a support structure 112. A traveler 114 is mounted for slidable movement along cable 110 and has an apertured flange or fin 115 which is adapted to be secured to a leash (not shown) by connector 118, which is similar to the connector 90 of FIG. 6. The retaining device 109 may be constructed of sheet metal which is rolled into a generally tubular shape, and which has an axially-extending passageway 119 for loosely receiving the cable 110. A longitudinally extending slit 121 in the retaining device 109 divides the same into a pair of oppositely-disposed spring jaws 123 and 125 which serve the same purpose as the jaws 40 and 41 of the retaining device of FIG. 1. A pair of oppositely-disposed inwardly turned flanges or lips 127 and 129 on the respective jaws 123 and 125 retain the cable 110 within the retaining device 109 as the traveler 114 passes therethrough.

As shown in FIG. 8, a pair of oppositely-disposed sloping end edges 132 and 134 are inclined toward the slit 121 and serve as cam surfaces in the same manner as the cam surfaces 48 and 49 of FIG. 2 to guide the follower 110 so that its flange 116 enters the slit 121 to spread apart the jaws 123 and 125. A pair of dimpled holes, such as the hole 136, are adapted to receive a pair of mounting screws 138 which extend therethrough and are driven into the supporting structure 112 to mount the retaining device 109 thereon.

Referring now to FIG. 10, there is shown a template or blank 141 which is formed into the retaining device 109 of FIG. 8. The blank 141 is square in shape and has rounded corners 143. A pair of dimpled holes 145 near a pair of oppositely-disposed corners 143 serve to receive the mounting screws, such as the screws 138. In order to form the blank 141 into the retaining device 109, the oppositely-disposed corners 143 remote from the holes 145 are bent at an angle of 90° relative to the plane of the blank 141 to form the lips 127 and 129 of the device 109, and then the blank 141 is rolled into a tubular shape about an axis parallel to a line extending between the holes 145. The blank 141 illustrated is a metal stamping, and it is heat treated after forming into its tubular shape to provide the jaws 123 and 125 of the device 109 with their resilient characteristics.

What is claimed is:

1. An animal run leash guide assembly for confining the movement in opposite directions of a tethered animal to an area defined by an endless cable, said assembly comprising, at least one retaining member for securing the cable in said area, said retaining member adapted to be mounted to a support surface, a traveler slidably engaged along said cable and connected to said tether, said retaining member including a pair of opposing resilient jaws defining a passageway therethrough, said jaws arranged to be spread by said traveler so as to permit said traveler to pass unimpeded therebetween in opposite directions.

2. An assembly according to claim 1 wherein said retaining device further includes a pair of inwardly turned lips on said jaws to retain said cable within said passageway.

3. An animal run leash guide assembly for confining the movement in opposite directions of a tethered animal to an area defined by an endless cable, said assembly comprising, at least one retaining member for securing the cable in said area, said retaining member adapted to be mounted to a support surface, a traveler slidably engaged along said cable and connected to said tether, said retaining member including a pair of opposing resilient jaws defining a passageway therethrough and a pair of inwardly turned lips on said jaws to retain said cable within said passageway, said jaws having cam surfaces on opposite sides thereof for guiding said traveler into position for passage therebetween, said jaws arranged to be spread by said traveler so as to permit said traveler to pass unimpeded therebetween in opposite directions.

4. As assembly according to claim 3 wherein said traveler includes an outstanding flange, said cable being connected to the flange, said flange being beveled to permit passage thereof between said jaws.

5. An assembly according to claim 4 wherein said jaws include generally V-shaped cutout portions on opposite sides thereof to guide said flange for passage between said jaws, said cam surfaces including smooth inwardly-tapered surfaces extending toward said V-shaped cutout portions for guiding said flange thereto.

6. An assembly according to claim 5 wherein said retaining member comprises an elongated block having sloping end portions, said block having a base for mounting to said support structure and having a face opposite said base, said face having a longitudinally extending slit opening into said passageway to define said jaws.

7. An assembly according to claim 3 wherein said retaining member comprises an elongated tubular member having a longitudinally extending slit defining said jaws, said cam surfaces including sloping opposite end edge portions of said member, said sloping end portions being inclined toward said slit.

* * * * *